(12) United States Patent
Avataneo et al.

(10) Patent No.: US 12,319,757 B2
(45) Date of Patent: Jun. 3, 2025

(54) METHOD FOR MAKING FLUOROPOLYMERS

(71) Applicant: SOLVAY SPECIALTY POLYMERS ITALY S.P.A., Bollate (IT)

(72) Inventors: Marco Avataneo, Milan (IT); Ugo De Patto, Cogliate (IT); Giuseppe Marchionni, Milan (IT); Mirko Tavano, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 399 days.

(21) Appl. No.: 17/852,254

(22) Filed: Jun. 28, 2022

(65) Prior Publication Data

US 2022/0332854 A1   Oct. 20, 2022

Related U.S. Application Data

(63) Continuation of application No. 16/645,385, filed as application No. PCT/EP2018/073659 on Sep. 4, 2018, now Pat. No. 11,401,352.

(30) Foreign Application Priority Data

Sep. 8, 2017   (EP) ..................... 17190164

(51) Int. Cl.
| | |
|---|---|
| C08F 2/24 | (2006.01) |
| C08F 14/18 | (2006.01) |
| C08F 14/20 | (2006.01) |
| C08F 14/22 | (2006.01) |
| C08F 14/26 | (2006.01) |
| C08L 71/02 | (2006.01) |

(52) U.S. Cl.
CPC .............. *C08F 2/24* (2013.01); *C08F 14/185* (2013.01); *C08F 14/20* (2013.01); *C08F 14/22* (2013.01); *C08F 14/26* (2013.01); *C08L 71/02* (2013.01)

(58) Field of Classification Search
None
See application file for complete search history.

(56) References Cited

U.S. PATENT DOCUMENTS

| | | | | |
|---|---|---|---|---|
| 4,384,128 | A * | 5/1983 | Krespan | C08G 65/226 549/532 |
| 6,429,258 | B1 * | 8/2002 | Morgan | C08F 14/26 524/544 |
| 8,557,952 | B2 * | 10/2013 | Marchionni | C08G 65/007 528/401 |
| 11,401,352 | B2 * | 8/2022 | Avataneo | C08L 71/02 |
| 2008/0114121 | A1 * | 5/2008 | Brothers | C08F 14/18 524/599 |

* cited by examiner

*Primary Examiner* — Katarzyna I Kolb
(74) *Attorney, Agent, or Firm* — Osha Bergman Watanabe & Burton LLP

(57) ABSTRACT

The invention pertains to a method of making fluoropolymer dispersions using certain polyfunctional perfluoropolyether derivatives including a plurality of ionisable groups selected from the group consisting of $-SO_3X_a$, $-PO_3X_a$ and $-COOX_a$, whereas $X_a$ is H, an ammonium group or a monovalent metal, and whereas said groups are comprised as pendant groups in the perfluoropolyether chain, and to fluoropolymer dispersions therefrom.

16 Claims, No Drawings

METHOD FOR MAKING FLUOROPOLYMERS

CROSS-REFERENCE TO RELATED APPLICATION

This application is a continuation of U.S. application Ser. No. 16/645,385 filed Mar. 6, 2020, which is a national stage entry under 35 U.S.C. § 371 of International Application No. PCT/EP2018/073659 filed Sep. 4, 2018, which claims priority to European application No. 17190164.8, filed on Sep. 8, 2017. The entire contents of these applications are explicitly incorporated herein by this reference.

TECHNICAL FIELD

The present invention pertains to a method of making fluoropolymer dispersions using certain polyfunctional perfluoropolyether derivatives, and to fluoropolymer dispersions therefrom.

BACKGROUND ART

Fluoropolymers, i.e. polymers having a fluorinated backbone, have been long known and have been used in a variety of applications because of several desirable properties such as heat resistance, chemical resistance, weatherability, UV-stability etc.

A frequently used method for producing fluoropolymers involves aqueous emulsion polymerization of one or more fluorinated monomers generally involving the use of fluorinated surfactants. Frequently used fluorinated surfactants include perfluorooctanoic acids and salts thereof, in particular ammonium perfluorooctanoic acid.

Recently, perfluoroalkanoic acids having 8 or more carbon atoms have raised environmental concerns. For instance, perfluoroalkanoic acids have been found to show bioaccumulation. Accordingly, efforts are now devoted to phasing out from such compounds and methods have been developed to manufacture fluoropolymer products using alternative surfactants having a more favourable toxicological profile.

Several approaches have been recently pursued to this aim, typically involving fluorosurfactants comprising a perfluoroalkyl chain interrupted by one or more catenary oxygen atoms, said chain having an ionic carboxylate group at one of its ends.

Examples of these compounds which are endowed with improved bioaccumulation profile over perfluoro alkanoic acids having 8 or more carbon atoms can be found notably in US 2007276103 (3M INNOVATIVE PROPERTIES CO) 29 Nov. 2007, US 2007015864 (3M INNOVATIVE PROPERTIES CO) 18 Jan. 2007. US 2007015865 (3M INNOVATIVE PROPERTIES CO) 18 Jan. 2007, US 2007015866 (3M INNOVATIVE PROPERTIES CO) 18 Jan. 2007.

On the other side, approaches based on the use of perfluorinated polyether dispersants have been proposed in the past. In particular, U.S. Pat. No. 6,878,772 (SOLVAY SOLEXIS SPA) 12 Apr. 2005 provides for a method of making dispersions of fluoropolymers comprising polymerizing fluoromonomers in an aqueous medium comprising a bifunctional surfactant of formula A-R$_f$—B (I) wherein: A and B, equal to or different from each other, are: —(O)$_p$CFX—COOM wherein: M=NH$_4$, alkaline metal, H; X=F, CF$_3$; p is an integer equal to 0 or 1; R$_f$ is a linear or branched perfluoroalkyl chain, or a (per)fluoropolyether chain such that the number average molecular weight of (I) is in the range 300-1,800, possibly in combination with certain other surfactants. Nevertheless, data comprised in this patent document clearly show ineffectiveness of bifunctional perfluoropolyether dicarboxylates having molecular weight exceeding the claimed range; in particular, a dicarboxylate possessing a molecular weight of 4,000 was found to be ineffective in stabilizing dispersion of PTFE during polymerization, so causing substantial fouling and complete coagulation, with hence unstable polymerization kinetics.

Similarly, US 2008114122 (E.I. DUPONT DE NEMOURS) 15 May 2008 teaches a process comprising polymerizing fluorinated monomers in an aqueous medium in the presence of a polymerization agent comprising:

a fluoropolyether acid or salt thereof having a number average molecular weight of at least 800 g/mol, which may comprise acid groups selected from carboxylic acid, sulfonic acid, sulfonamide, phosphonic acid at one end or both ends of the perfluoropolyether chain, and which preferably has has a number average molecular weight of about 800 to about 3500 g/mol, and most preferably 1000 to about 2500 g/mol; and fluoropolyether acid or salt surfactant having a molecular weight of less than 600 g/mol, wherein said polymerization agent comprises a minor amount of fluoropolyether acid or salt thereof having a number average molecular weight of at least 800 g/mol and a major amount of said fluoropolyether acid or salt surfactant. Also in this case, the perfluoropolyether derivative of higher molecular weight is solely used as adjuvant in lower amount to the lower molecular weight surfactant, which is essential for achieving the advantages of the invention.

WO 2016/050776 (SOLVAY SPECIALTY POLYMERS ITALY SPA) 7 Apr. 2016 discloses a method of emulsion polymerizing fluorinated monomers in the presence of a surfactant mixture comprising at least one perfluorohexanoic acid or salt and at least one linear bifunctional perfluoropolyether surfactant X$_p$OOC—CF$_2$—O—(CF$_2$O)$_n$'(CF$_2$CF$_2$O)$_m$'—CF$_2$—COOX$_p$ (I) wherein: X$_p$, equal to or different from each other, is a hydrogen atom, a monovalent metal, preferably an alkaline metal, or an ammonium group of formula —N(R'$_n$)$_4$, wherein R'$_n$, equal or different at each occurrence, is a hydrogen atom or a C$_1$-C$_6$ hydrocarbon group, preferably an alkyl group; n' and m' are independently integers >0 such that the number average molecular weight of the surfactant (PFPE) is of 500 to 2500.

U.S. Pat. No. 4,384,128 (E.I. DUPONT DE NEMOURS) 17 May 1983 discloses certain perfluoroglycidyl ethers, which by copolymerization with hexafluoropropylene oxide and possible further reactions, such as hydrolysis, can provide for perfluoropolyethers comprising ionizable chains. In particular, Ex. 11 describes the polymerization and Ex. 23 provides for a post-polymerization treatment to yield a perfluoropolyether comprising sulfonic acid side groups.

Generally speaking, while all these approaches targeting alternative fluorinated surfactants which desirably show lower bioaccumulation/bio-persistence than perfluoro alkanoic acids having 8 or more carbon atoms still may involve the use of fluorocompounds which may be highly fluorinated, and/or which may have a molecular weight low enough to possibly enable them to permeate live cells' membranes, and which may nonetheless have a certain (bio-)persistence.

Additional efforts have been hence undertaken for developing solutions where substantially no such possibly harmful compounds are used, but wherein the stabilizing/dispersing agent system used be such that polymerization can be carried out in a convenient and cost effective way, using same equipment commonly used in the aqueous emulsion polymerization of fluorinated monomers with traditional surfactants, achieving reasonable productivities and acceptable latex stability.

DISCLOSURE OF INVENTION

It has been found that certain polyfunctional perfluoropolyether dispersants, as below detailed, are effective in the aqueous emulsion polymerization of fluoromonomers, in particular of tetrafluoroethylene and/or of vinylidene fluoride, even when used without the addition of other surfactants, including fluorinated surfactants, enabling appreciable polymerization kinetics and providing stable dispersions.

Thus, in one aspect, the invention relates to a method for making a fluoropolymer comprising emulsion polymerizing one or more than one fluorinated monomer in an aqueous medium wherein said aqueous emulsion polymerization is carried out in an aqueous medium in the presence of at least one radical initiator and at least one polyfunctional perfluoropolyether dispersant [dispersant (D)], said dispersant (D) comprising a plurality of ionisable groups [groups (X), herein after] selected from the group consisting of —SO$_3$X$_a$, —PO$_3$X$_a$ and —COOX$_a$, whereas X$_a$ is H, an ammonium group or a monovalent metal, and complying with formula:

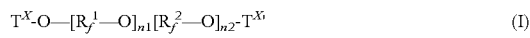
$$T^{X}\text{-O}-[R_f^1-O]_{n1}[R_f^2-O]_{n2}\text{-}T^{X\prime} \quad (I)$$

wherein:
(i) each of $R_f^1$, equal to or different from each other at each occurrence, is a $C_1$-$C_4$ perfluoroalkylene group;
(ii) each of $R_f^2$, equal to or different from each other at each occurrence, is a $C_1$-$C_4$ perfluoroalkylene group comprising at least one group (X), as above detailed; and
(iii) n1 and n2 are positive numbers different from zero. $T^x$ and $T^{x\prime}$, equal to or different from each other, are selected from the group consisting of:
(j) $C_1$-$C_{24}$ (hydro)(fluoro)carbon groups free from group (X), as above detailed, possibly comprising one or more than one of H, O, and Cl; and
(jj) $C_1$-$C_{24}$ (hydro)(fluoro)carbon groups comprising at least one group (X), as above detailed; and
said dispersant (D) possessing a number averaged molecular weight of more than 2000.

The Applicant has surprisingly found that dispersant (D), thanks to the presence of ionisable groups as pendant groups in the perfluoropolyether chain, and possibly as chain ends, despite the high molecular weight thereof, possesses sufficient surface active effect and dispersing ability for ensuring efficient stabilization of fluoropolymer dispersion during polymerization. Further, in addition, although dispersant (D) residues may be comprised in the fluoropolymer so manufactured, the same are not causing any discoloration nor bubbling issues upon further processing of the fluoropolymer, thanks to their low volatility and high thermal stability.

In the method of making a fluoropolymer, one or more dispersants (D) are used in the aqueous emulsion polymerization of one or more fluorinated monomers, in particular gaseous fluorinated monomers.

By gaseous fluorinated monomers is meant monomers that are present as a gas under the polymerization conditions. In a particular embodiment, the polymerization of the fluorinated monomers is started in the presence of the dispersants (D), i.e. the polymerization is initiated in the presence of the same. The amount of dispersants (D) used may vary within the mentioned range depending on desired properties such as amount of solids, monomers' conversion, etc. . . . Generally the amount of dispersant (D) will be of at least 0.05% wt, preferably of at least 0.10% wt and advantageously at most 3.20% wt, preferably at most 3.00% wt, with respect to the total weight of the aqueous medium. A practical range is between 0.15% wt and 2.75% wt, with respect to the total weight of the aqueous medium.

While the polymerization is generally initiated in the presence of the dispersant (D), it is not excluded to add further dispersant (D) during the polymerization, although such will generally not be necessary.

As above explained dispersant (D) is an oligomer possessing a number averaged molecular weight of beyond 2 000, and yet a number averaged molecular weight of at most 200 000, preferably of at most 100 000.

The choice of a number averaged molecular weight of beyond 2000 is particularly advantageous for ensuring that dispersant (D) has a toxicological profile such not to be able to penetrate live cells' membranes.

On the other side, upper boundaries for the number averaged molecular weight of dispersant (D) is specifically critical to ensure dispersant is behaving appropriately as a dispersing agent, but yet, its final weight fraction in fluoropolymer to be manufacture is negligible.

Preferably the dispersant (D) possesses a number averaged molecular weight of at least 3 000, preferably of at least 4 000 and/or advantageously of at most 25 000, preferably of at most 20 000.

Particularly good results have been obtained with dispersants possessing a number averaged molecular weight of from 5 000 to 15 000.

Determination of number averaged molecular weight of the dispersant (D) can be carried out by any known means; for instance, $^{19}$F-NMR can be satisfactorily used.

As said, dispersant (D) comprises a plurality of ionisable groups selected from the group consisting of —SO$_3$X$_a$, —PO$_3$X$_a$ and —COOX$_a$, whereas X$_a$ is H, an ammonium group or a monovalent metal. Preferably dispersant (D) comprises a plurality of ionisable groups selected from the group consisting of —SO$_3$X$_a$, and —COOX$_a$, whereas X$_a$ is H, an ammonium group or a monovalent metal.

The amount of said ionisable groups in dispersant (D) is generally of at least 0.35, preferably at least 0.40, more preferably at least 0.50 meq/g, with respect to the weight of dispersant (D). There's no substantial limitation as per the maximum amount of the said ionisable groups comprised in dispersant (D). It is generally understood that the said ionisable groups are generally present in an amount of at most 2.50 meq/g, preferably at most 2.20 meq/g, more preferably at most 2.00 meg/g.

Repeating units —$R_f^1$—O— of the dispersant (D) are generally selected from the group consisting of:
(a1) units —CF$_2$CF$_2$O—
(b1) units —CFYO—
(c1) units —CF$_2$CFYO—
(d1) units —CF$_2$O—
(e1) units —CF$_2$(CF$_2$)$_z$CF$_2$O—,
wherein:
Y is a $C_1$-$C_5$ perfluoro(oxy)alkyl group; z is 1 or 2.
Repeating units —$R_f^2$—O— of the dispersant (D) are generally selected from the group consisting of:
(a2) units —CF$_2$CF(G$_x$)O—
(b2) units —CF(G$_x$)O—
(c2) units —CF$_2$(CF$_2$)$_{x1}$CF(G$_x$)(CF$_2$)$_{x2}$O—, with X1 and X2 being zero or integers from 1 to 2, with the provision that X1+X2 is at least 1, wherein:

$G_x$ is a $C_1$-$C_5$ perfluoro(oxy)alkylene group comprising at least one group (X) as above detailed.

According to a first embodiment, dispersant (D) comprises a plurality of ionisable groups selected from the group consisting of carboxylic groups of formula —$COOX_a$, whereas $X_a$ is H, an ammonium group or a monovalent metal.

Repeating units —$R_f^2$—O— of the dispersant (D) of this first embodiment of the invention are generally selected from the group consisting of:

(a2') units —$CF_2CF(COOX_a)O$—

(b2') units —$CF(COOX_a)O$—

(c2') units —$CF_2(CF_2)_{x1}CF(COOX_a)(CF_2)_{x2}O$—, with X1 and X2 being zero or integers from 1 to 2, with the provision that X1+X2 is at least 1, wherein $X_a$ is H, an ammonium group or a monovalent metal.

Dispersant (D) according to this first embodiment is hence preferably a compound complying with formula:

$$T^C\text{-O}—(CF_2CF_2O)_{a'}(CFYO)_{b'}(CF_2CFYO)_{c'}(CF_2O)_{d'}$$
$$(CF_2(CF_2)_zCF_2O)_{e'}(CF_2CF(COOX_a)O)_{f'}(CF$$
$$(COOX_a)O)_{g'}(CF_2CF(COOX_a)CF_2CF_2O)_{h'}$$
$$(CF_2CF_2CF(COOX_a)CF_2O)_{i'}\text{-}T^{C'},$$

wherein:

Y is a $C_1$-$C_5$ perfluoro(oxy)alkyl group;

z is 1 or 2;

a', b', c', d', e', f', g', h', i' are ≥0, with the provision that a'+b'+c'+d'+e' is >0 and f'+g'+h'+I'>0;

$X_a$ is H, an ammonium group or a monovalent metal;

each of $T^C$ and $T^{C'}$, equal to or different from each other, are selected from the group consisting of (j) ionisable groups $T^{x''}$ of any of formulae —$CFZ^*$—$COOX_a$, —$CFZ^*CH_2$—$COOX_a$, and —$CFZ^*$—$CH_2(OCH_2CH_2)_k$—$COOX_a$, wherein $Z^*$ is F or $CF_3$; k is ranging from 0 to 10; $X_a$ is H, an ammonium group or a monovalent metal and (jj) non-ionisable groups $C_1$-$C_3$ (per)fluoroalkyl groups free from —$COOX_a$ groups, possibly comprising one or more than one of H, and Cl.

Dispersants (D) according to this first embodiment can be manufactured notably using the methods described in U.S. Pat. No. 5,059,700 (AUSIMONT SPA) 22110/1991 and U.S. Pat. No. 5,177,226 (AUSIMONT SPA) 5 Jan. 1993.

According to a second embodiment, dispersant (D) comprises a plurality of ionisable groups selected from the group consisting of sulphonic acid groups of formula —$SO_3X_a$, whereas $X_a$ is H, an ammonium group or a monovalent metal, possibly in combination with carboxylic groups of formula —$COOX_a$.

Repeating units —$R_f^2$—O— of the dispersant (D) of this second embodiment of the invention are generally selected from the group consisting of:

(a2") units —$CF_2CF(G^{SO3X})O$—

(b2") units —$CF(G^{SO3X})O$—

(c2") units —$CF_2(CF_2)_{x1}CF(G^{SO3X})(CF_2)_{x2}O$—, with X1 and X2 being zero or integers from 1 to 2, with the provisio that X1+X2 is at least 1, wherein $G^{SO3X}$ is a group of formula:

(j) —O—$(CF_2)_mSO_3X_a$, with $X_a$ being H, an ammonium group or a monovalent metal; m is an integer between 1 and 10, preferably between 1 and 6, more preferably between 2 and 4, even more preferably m equals 2;

(jj) —$(OCF_2CF(R_{F1}))_w$—O—$CF_2(CF(R_{F2}))_ySO_3X_a$, with $X_a$ as above detailed; wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F.

Dispersant (D) according to this second embodiment is hence preferably a compound complying with formula:

$$T^D\text{-O}—(CF_2CF_2O)_{a'}(CFYO)_{b'}(CF_2CFYO)_{c'}(CF_2O)_{d'}$$
$$(CF_2(CF_2)_zCF_2O)_{e'}(CF_2CF(G^{SO3X})O)_{f'}(CF$$
$$(G^{SO3X})O)_{g'}(CF_2CF(G^{SO3X}_a)CF_2CF_2O)_{h'}$$
$$(CF_2CF_2CF(G^{SO3X})CF_2O)_{i'}\text{-}T^{D'},$$

wherein:

Y is a $C_1$-$C_5$ perfluoro(oxy)alkyl group;

z is 1 or 2;

a', b', c', d', e', f', g', h', i' are ≥0, with the provision that a'+b'+c'+d'+e' is >0 and f'+g'+h'+I'>0;

$X_a$ is H, an ammonium group or a monovalent metal;

each of $T^D$ and $T^{D'}$, equal to or different from each other, are selected from the group consisting of (j) ionisable groups $T^{x''}$ of any of formulae —$CFZ^*$—$COOX_a$, —$CFZ^*CH_2$—$COOX_a$, and —$CFZ^*$—$CH_2(OCH_2CH_2)_k$—$COOX_a$, wherein $Z^*$ is F or $CF_3$; k is ranging from 0 to 10; $X_a$ is H, an ammonium group or a monovalent metal and (jj) non-ionisable groups $C_1$-$C_3$ (per)fluoroalkyl groups free from —$COOX_a$ groups, possibly comprising one or more than one of H, and Cl.

More preferably, dispersant (D) according to this second embodiment is a compound complying with formula:

$$T^E\text{-O}—(CF_2CF_2O)_{a'}(CFYO)_{b'}(CF_2CFYO)_{c'}(CF_2O)_{d'}$$
$$(CF_2(CF_2)_zCF_2O)_{e'}(CF_2CF(OCF_2CF_2SO_3X_a)O)_{f'}$$
$$(CF(OCF_2CF_2SO_3X_a)O)_{g'}\text{-}T^{E'},$$

wherein:

Y is a $C_1$-$C_5$ perfluoro(oxy)alkyl group;

z is 1 or 2;

a', b', c', d', e', f', g' are ≥0, with the provision that a'+b'+c'+d'+e' is >0 and f'+g'>0;

$X_a$ is H, an ammonium group or a monovalent metal;

each of $T^D$ and $T^{D'}$, equal to or different from each other, are selected from the group consisting of (j) ionisable groups $T^{x''}$ of any of formulae —$CFZ^*$—$COOX_a$, —$CFZ^*CH_2$—$COOX_a$, and —$CFZ^*$—$CH_2(OCH_2CH_2)_k$—$COOX_a$, wherein $Z^*$ is F or $CF_3$; k is ranging from 0 to 10; $X_a$ is H, an ammonium group or a monovalent metal and (jj) non-ionisable groups $C_1$-$C_3$ (per)fluoroalkyl groups free from —$COOX_a$ groups, possibly comprising one or more than one of H, and Cl.

Dispersants (D) according to this second embodiment can be manufactured notably using the methods described in U.S. Pat. No. 6,403,539 (AUSIMONT SPA) 11 Jun. 2002.

The aqueous emulsion polymerization may be carried out at a temperature between 10° C. to 150° C., preferably 20° C. to 130° C. and the pressure is typically between 2 and 60 bar, in particular 5 to 45 bar.

The reaction temperature may be varied during the polymerization e.g. for influencing the molecular weight distribution, i.e., to obtain a broad molecular weight distribution or to obtain a bimodal or multimodal molecular weight distribution.

The pH of the polymerization media may be in the range of pH 2-11, preferably 3-10, most preferably 4-10.

As said, the method of the invention is carried out in an aqueous medium in the presence of at least one radical initiator, i.e. any of the initiators known for initiating a free radical polymerization of ethylenically unsaturated monomers. Suitable radical initiators include notably peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, di-ter-butyl-peroxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic initiators include for example ammonium-, alkali- or earth alkali-salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include hydroxymethane sodium sulfinate (Rongalite) or fluoroalkyl sulfinates such as those disclosed in U.S. Pat. No. 5,285,002. The reducing agent typically reduces the half-life time of the persulfate initiator. Additionally, a metal salt catalyst such as for example copper, iron or silver salts may be added.

The amount of initiator may be between 0.01% by weight (based on the fluoropolymer to be produced) and 1% by weight. Still, the amount of initiator is preferably between 0.05 and 0.5% by weight and more preferably between 0.05 and 0.3% by weight, based on the fluoropolymer to be produced.

The aqueous emulsion polymerization can be carried out in the presence of other materials, such as notably paraffin waxes, buffers and, if desired, complex-formers or chain-transfer agents.

Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters can be effective as chain transfer agent in the method of the invention.

Further, the aqueous emulsion polymerization of the method of the invention can be carried out in the presence of certain fluorinated fluids deprived of ionisable groups, typically enabling formation of nanosized droplets (average size of less than 50 nm, preferably of less than 30 nm), and advantageously stabilized in aqueous dispersion by the presence of the dispersant (D).

Should the method of the invention be carried out in the presence of a fluorinated fluid, as above detailed, it may be preferable to first homogenously mix the dispersant (D) and said fluid in an aqueous medium, and then feeding the so obtained aqueous mixture of the dispersant (D) and said fluid in the polymerization medium. This technique is particularly advantageous as this pre-mix can advantageously enable manufacture of an emulsion of said fluid in an aqueous phase comprising the dispersant (D), wherein this emulsion comprises dispersed droplets of said fluid having an average size of preferably less than 50 nm, more preferably of less than 40 nm, even more preferably of less than 30 nm.

Fluids which can be used according to this embodiment are preferably (per)fluoropolyethers comprising recurring units (R1), said recurring units comprising at least one ether linkage in the main chain and at least one fluorine atom (fluoropolyoxyalkene chain). Preferably the recurring units R1 of the (per)fluoropolyether are selected from the group consisting of:
(I) —CFX—O—, wherein X is —F or —$CF_3$; and
(II) —$CF_2$—CFX—O—, wherein X is —F or —$CF_3$; and
(III) —$CF_2$—$CF_2$—$CF_2$—O—; and
(IV) —$CF_2$—$CF_2$—$CF_2$—$CF_2$—O—; and
(V) —$(CF_2)_j$—CFZ—O— wherein j is an integer chosen from 0 and 1 and Z is a fluoropolyoxyalkene chain comprising from 1 to 10 recurring units chosen among the classes (I) to (IV) here above; and mixtures thereof.

Should the (per)fluoropolyether comprise recurring units R1 of different types, advantageously said recurring units are randomly distributed along the fluoropolyoxyalkene chain.

Preferably the (per)fluoropolyether is a compound complying with formula (I-p) here below:

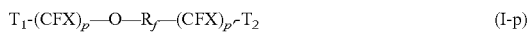

wherein:
each of X is independently F or $CF_3$;
p and p', equal or different each other, are integers from 0 to 3;
$R_f$ is a fluoropolyoxyalkene chain comprising repeating units R°, said repeating units being chosen among the group consisting of:
(i) —CFXO—, wherein X is F or $CF_3$,
(ii) —$CF_2$CFXO—, wherein X is F or $CF_3$,
(iii) —$CF_2CF_2CF_2O$—,
(iv) —$CF_2CF_2CF_2CF_2O$—,
(v) —$(CF_2)_j$—CFZ—O— wherein j is an integer chosen from 0 and 1 and Z is a group of general formula —$OR'_fT_3$, wherein $R'_f$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$; and $T_3$ is a $C_1$-$C_3$ perfluoroalkyl group, and mixtures thereof;
$T_1$ and $T_2$, the same or different each other, are H, halogen atoms, $C_1$-$C_3$ fluoroalkyl groups, optionally comprising one or more H or halogen atoms different from fluorine.

The expression "fluorinated monomer" is hereby intended to denote a ethylenically unsaturated monomer comprising at least one fluorine atom.

The fluorinated monomer may further comprise one or more other halogen atoms (Cl, Br, I).

Non limiting examples of suitable ethylenically unsaturated fluorinated monomers are:
$C_2$-$C_8$ perfluoroolefins, such as tetrafluoroethylene (TFE), hexafluoropropylene (HFP), perfluoroisobutylene;
$C_2$-$C_8$ hydrogen-containing fluoroolefins, such as trifluoroethylene (TrFE), vinylidene fluoride (VDF), vinyl fluoride (VF), pentafluoropropylene, and hexafluoroisobutylene;
$C_2$-$C_8$ chloro- and/or bromo- and/or iodo-containing fluoroolefins, such as chlorotrifluoroethylene (CTFE) and bromotrifluoroethylene;
fluoroalkylvinylethers of formula $CF_2$=$CFOR_{f1}$, wherein $R_{f1}$ is a $C_1$-$C_6$ fluoroalkyl, e.g. —$CF_3$, —$C_2F_5$, —$C_3F_7$;
fluorooxyalkylvinylethers of formula $CF_2$=$CFOX_0$, wherein $X_0$ is a $C_1$-$C_{12}$ fluorooxyalkyl group comprising one or more than one ethereal oxygen atom, including notably fluoromethoxyalkylvinylethers of formula $CF_2$=$CFOCF_2OR_{f2}$, with $R_{f2}$ being a $C_1$-$C_3$ fluoro(oxy)alkyl group, such as —$CF_2CF_3$, —$CF_2CF_2$—O—$CF_3$ and —$CF_3$ fluorodioxoles, of formula:

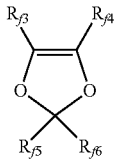

wherein each of $R_{f3}$, $R_{f4}$, $R_{f5}$, $R_{f6}$, equal or different each other, is independently a fluorine atom, a $C_1$-$C_6$ fluoro(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferred fluorinated monomers for use in the method of the present invention include tetrafluoroethylene (TFE), chlorotrifluoroethylene (CTFE), hexafluoropropylene (HFP), vinyl fluoride (VF), vinylidene fluoride (VDF), and most preferably TFE or VDF, alone or combined, or in combination with other monomers.

The method of the invention may further involve one or more than one fluorine-free ethylenically unsaturated monomer, also referred to as "hydrogenated monomer". The choice of the said hydrogenated comonomer(s) is not particularly limited; alpha-olefins, (meth)acrylic monomers, vinyl ether monomers, styrenic monomoners may be used.

The method of the present invention may be used to produce a variety of fluoropolymers including perfluoropolymers, which have a fully fluorinated backbone, as well as partially fluorinated fluoropolymers. Also the method of the invention may result in melt-processable fluoropolymers as well as those that are not melt-processable such as for example polytetrafluoroethylene and so-called modified polytetrafluoroethylene. The method of the invention can further yield fluoropolymers that can be cured to make fluoroelastomers as well as fluorothermoplasts. Fluorothermoplasts are generally fluoropolymers that have a distinct and well noticeable melting point, typically in the range of 60 to 320° C. or between 100 and 320° C. They thus have a substantial crystalline phase. Fluoropolymers that are used for making fluoroelastomers typically are amorphous and/or have a negligible amount of crystallinity such that no or hardly any melting point is discernable for these fluoropolymers.

The Applicant has found that dispersants (D) are particularly effective for manufacturing thermoplastic vinylidene fluoride polymers by polymerizing vinylidene fluoride (VDF) optionally in combination with one or more than one hydrogenated and/or fluorinated monomer different from VDF, and/or for manufacturing thermoplastic tetrafluoroethylene polymers by polymerizing tetrafluoroethylene (TFE) optionally in combination with one or more than one hydrogenated and/or fluorinated monomer different from TFE.

Generally speaking, the method of the invention is carried out in the substantial absence of fluorinated emulsifiers having a molecular weight of less than 1000.

The expression "substantial absence" when used in connection to the fluorinated emulsifiers means that no such surfactant is purposely added to the polymerization. While impurities possibly qualifying as fluorinated surfactants with a molecular weight of less than 1000 might be tolerated, their amount is generally below of detection limit of standard analytical techniques (<1 ppm, with respect to the aqueous medium).

More specifically, the method of the invention include polymerizing in an aqueous medium which is substantially free from fluorinated emulsifier [surfactant (FS)] of formula:

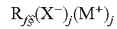

wherein $R_{fS}$ is a $C_3$-$C_{30}$ (per)fluoroalkyl chain, (per)fluoro(poly)oxyalkylenic chain, $X^-$ is —$COO^-$, —$PO_3^-$ or —$SO_3^-$, $M^+$ is selected from $H^+$, $NH_4^+$, an alkaline metal ion and j can be 1 or 2 can be used.

As non-limitative examples of surfactants (FS), mention may be made of ammonium and/or sodium (per)fluoro(oxy)carboxylates, and/or (per)fluoropolyoxyalkylenes having one or more carboxylic end groups.

Examples of fluorinated surfactants, in particular of (per)fluorooxyalkylenic surfactants, are notably described in US 2007015864 (3M INNOVATIVE PROPERTIES) 8 Jan. 2007, US 2007015865 (3M INNOVATIVE PROPERTIES CO) 18 Jan. 2007, US 2007015866 (3M INNOVATIVE PROPERTIES CO) 18 Jan. 2007, US 2007025902 (3M INNOVATIVE PROPERTIES CO) 1 Feb. 2007.

For instance, the fluorinated emulsifiers [surfactant (FS)] substantially excluded from the method of the invention are notably:

$CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$;

$T(C_3F_8O)_{n0}(CFXO)_{m0}CF_2COOM''$, in which T represents Cl or a perfluoroalkoxyde group of formula $C_kF_{2k+1}O$ with k is an integer from 1 to 3, one F atom being optionally substituted by a Cl atom; no is an integer ranging from 1 to 6; $m_0$ is an integer ranging from 0 to 6; M'' represents H, $NH_4$, Na, Li or K; X represents F or $CF_3$;

F—$(CF_2—CF_2)_{n2}$—$CH_2$—$CH_2$—$RO_3M'''$, in which R is P or S, preferably S, M''' represents H, $NH_4$, Na, Li or K, preferably H; $n_2$ is an integer ranging from 2 to 5, preferably $n_2$=3;

A-$R_f$—B bifunctional fluorinated surfactants, in which A and B, equal to or different from each other, are —$(O)_pCFX$—$COOM^*$; $M^*$ represents H, $NH_4$, Na, Li or K, preferably $M^*$ represents $NH_4$; X=F or $CF_3$; p is an integer equal to 0 or 1; $R_f$ is a linear or branched perfluoroalkyl chain, or a (per)fluoropolyether chain such that the number average molecular weight of A-$R_f$—B is in the range 300 to 1,000;

$R'_f$—O—$(CF_2)_r$—O-L-COOM', wherein $R'_f$ is a linear or branched perfluoroalkyl chain, optionally comprising catenary oxygen atoms, M' is H, $NH_4$, Na, Li or K, preferably M' represents $NH_4$; r is 1 to 3; L is a bivalent fluorinated bridging group, preferably —$CF_2CF_2$— or —CFX—, X=F or $CF_3$;

$R''_f$—$(OCF_2)_r$—O—$(CF_2)_v$—COOM'', wherein $R''_f$ is a linear or branched perfluoroalkyl chain, optionally comprising catenary oxygen atoms, M'' is H, $NH_4$, Na, Li or K, preferably M'' represents $NH_4$; u and v are integers from 1 to 3;

$R'''_f$—$(O)_t$—CHQ-L-COOM''', wherein $R'''_f$ is a linear or branched perfluoroalkyl chain, optionally comprising catenary oxygen atoms, Q=F or $CF_3$, t is 0 or 1, M''' is H, $NH_4$, Na, Li or K, preferably M''' is $NH_4$; L is a bivalent fluorinated bridging group, preferably —$CF_2CF_2$— or —CFX—, X=F or $CF_3$;

cyclic fluorocompound of the following formula (I):

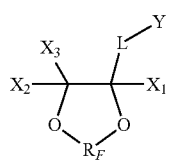

wherein $X_1$, $X_2$, $X_3$, equal or different from each other are independently selected among H, F, and $C_{1-6}$ (per) fluoroalkyl groups, optionally comprising one or more catenary or non-catenary oxygen atoms; L represents a bond or a divalent group; $R_F$ is a divalent fluorinated $C_{1-3}$ bridging group; Y is a hydrophilic function selected from groups of formulae:

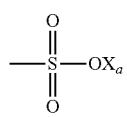

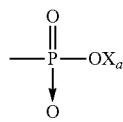

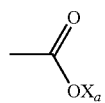

wherein $X_a$ is H, a monovalent metal (preferably an alkaline metal) or an ammonium group of formula —$N(R'_n)_4$, wherein R'n equal or different at each occurrence, represents a hydrogen atom or a $C_{1-6}$ hydrocarbon group.

The method of the invention typically results in an aqueous dispersion of the fluoropolymer further comprising dispersant (D), as above detailed, which is another object of the present invention.

The invention hence pertains to an aqueous dispersion of fluoropolymer particles comprising at least one dispersant (D), as detailed above.

All preferred embodiments described above for the dispersant (D) and the fluoropolymer in connection with the method of the invention are equally applicable to the aqueous dispersion of the invention, to the extent these features may characterize the same.

The particle size (volume average diameter) of the fluoropolymer is typically between 40 nm and 400 nm with a typical particle size between 60 nm and about 350 nm being preferred.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$— end groups.

For coating applications, an aqueous dispersion of the fluoropolymer is desired and hence the fluoropolymer will not need to be separated or coagulated from the dispersion.

To obtain a fluoropolymer dispersion suitable for use in coating applications such as for example in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids. Examples of non-ionic surfactants that may be added include $R^1$—O—[$CH_2CH_2O]_n$—[$R^2O]_m$—$R^3$ (NS) wherein $R^1$ represents an aromatic or aliphatic hydrocarbon group having from 6 to 18 carbon atoms, $R^2$ represents an alkylene having 3 carbon atoms, $R^3$ represents hydrogen or a $C_{1-3}$ alkyl group, n has a value of 0 to 40, m has a value of 0 to 40 and the sum of n+m being at least 2. It will be understood that in the above formula (NS), the units-indexed by n and m may appear as blocks or they may be present in an alternating or random configuration. Examples of non-ionic surfactants according to formula (NS) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (NS) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X080 from Clariant GmbH. Non-ionic surfactants according to formula (NS) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of fluoropolymer solids in the dispersion may be upconcentrated as needed or desired to an amount between 30 and 70% by weight. Any of the known upconcentration techniques may be used including ultrafiltration and thermal upconcentration.

Should the disclosure of any patents, patent applications, and publications which are incorporated herein by reference conflict with the description of the present application to the extent that it may render a term unclear, the present description shall take precedence.

The invention will be now explained in more detail with reference to the following examples, whose purpose is merely illustrative and not intended to limit the scope of the invention.

PREPARATIVE EXAMPLE 1—PREPARATION OF DISPERSANT (D-1)

A 800 ml photochemical reactor was used, with an optical path of 10 mm, equipped with a reflux condenser kept at the temperature of −80° C. with dry ice, and a thermocouple for temperature detecting. The reactor was equipped with a system of GALDEN® HT55-cooled quartz sheaths for the insertion of the UV Lamp (HANAU type TQ 150), emitting at a wavelength comprised within the range of from 248 to 334 nm.

To the reactor, after cooling by dry ice-acetone bath, 600 ml of $CF_2Cl_2$ were charged; then the reactor being maintained at −60° C., to it, over 5 hours, 86.4 g (2.7 mol) of $O_2$, 90 g (0.9 mol) of $C_2F_4$ and 17.0 g (0.105 mol) of $C_4F_6$ were charged. At the end, the solvent was evaporated off, and 62 g of an oil were obtained. The produced oil was found by iodometric analysis to contain 2.12% by weight of peroxidic oxygen. $^{19}$F-N.M.R. spectrum, IR spectrum and peroxide content enabled demonstrating this oil being a compound made of sequences mainly of —CF$_2$—, —CF$_2$—CF$_2$—, —CF$_2$—CF(—CF(O)CF$_2$)—, —CF(—CF(O)CF$_2$)— —CF$_2$CF(O)CF—CF$_2$— units linked by ether and/or peroxy bridges. The product was found to possess a molecular weight determined by $^{19}$F-NMR of 18 000. The epoxy content, calculated by the same NMR $^{19}$F, was found to be 12.9 units per polymeric chain.

At this point an aliquot of the oil was submitted to a thermal treatment in order to remove peroxide moieties. 20 g of polymer were charged to a 50 cc flask equipped with thermometer and stirrer; over a 2-hour time the temperature was increased to 230° C.; the reaction mass was then kept for a further 6 hours at 230°-240° C. At the end of this thermal treatment, 14.2 g were obtained of a product which, at the iodometric analysis, comprised no detectable amount of peroxidic groups. The NMR $^{19}$F spectrum failed to provide any evidence of epoxy groups, but solely of corresponding carbonyl fluoride moieties.

The product obtained so far was then hydrolyzed with water by stirring at room temperature for 4 hrs. The final mass was then separated from water phase and washed with fresh water.

The final product was recovered after drying at 100° C. in vacuum apparatus. All the acylfluorides groups were found to be converted into correspondent carboxylic acid groups.

Dispersant (D-1) was found by $^{19}$F-NMR analysis to possess a number averaged molecular weight of 11 500, and was found to be composed of a majority of C1=(CF$_2$O) and C2=(CF$_2$CF$_2$O) units, with a ratio C2/C1 of 1.27, and of units comprising pendant ionisable repeat units of formulae —OCF$_2$CF(COOH)O— (predominant) and —OCF$_2$CF(COOH)CF$_2$— (minor) and —OCF(COOH)O— (negligible), and further including chain ends of formulae —CF$_2$COOH (73%), —CF$_2$Cl (21%) and —CF$_3$ (6%) (with percentages based on overall end groups). The total amount of ionisable groups was of 6.6 moles per mole of dispersant (D-1) (corresponding to about 0.57 meq/g), of which 5.1 moles per mole of dispersant (D-1) comprised in pendant ionisable repeat units, as above detailed, the remainder in chain ends.

The above described procedure was repeated several times, in order to collect an appropriate amount of dispersant (D1), which has been used in the herein below described polymerization runs.

Working Example 2: Polymerization of Tetrafluoroethylene (TFE) with the Dispersant (D-1) of Preparative Example 1

Step 1—Salification of Dispersant (D-1)

A 1 L flask was feeded with 600 g of demineralized water and 2 g of ammonia; then 12 g of the dispersant (D-1) of Preparative Example 1 were dropped in the flask. The dispersion obtained was stirred for 5 h at 40° C. until a homogeneous dispersion was obtained.

Step 2: Polymerization of Tetrafluoroethylene (TFE)

A 5 liters autoclave was deaerated with multiple cycles of vacuum and nitrogen filling, then charged with 1.6 liters of demineralized water and 614 grams of the dispersion obtained from Preparative Ex. 1 above, corresponding to 12 g of dispersant (D-1); after heating at 68° C. (stirring at 480 rpm) the autoclave was pressurized with tetrafluoroethylene (TFE) at 20.5 Bar and the reaction was started by feeding 60 ml of a solution containing 8 g/l of ammonium persulfate (APS).

The pressure of the autoclave was maintained at constant value of 20.5 Bar by feeding TFE until a quantity of 600 grams of TFE were fed, after 150 minutes the TFE feeding was stopped. By keeping constant stirring of 480 rpm the autoclave was cooled to ambient temperature the white-latex obtained was discharged after being kept under nitrogen bubbling for 16 hours to strip away residual monomers from the polymerization, and then stored in a plastic tank. The latex was then coagulated and obtained polymer confirms to be insoluble in each tested solvent.

Working Example 3: Polymerization of Tetrafluoroethylene (TFE) with the Dispersant (D-1) of Preparative Example 1

Step 1—Salification of Dispersant (D-1) in the Presence of PFPE Fluid

A 1 L flask was feeded with 50 g of GALDEN® D02 non-functional PFPE and 1 g of ammonia; then 10 g dispersant (D-1) of Preparative Example 1 was dropped in the flask. The dispersion obtained was stirred for 5 h at room temperature.

Step 2—Polymerization of Tetrafluoroethylene (TFE)

A 5 liters autoclave was deaerated with multiple cycles of vacuum and nitrogen filling, then charged with 1.6 liters of demineralized water and 61 grams of the dispersion obtained from Preparative Ex. 1 above, corresponding to 10 g of dispersant (D-1) of Preparative Example 1; after heating at 68° C. (stirring at 480 rpm) the autoclave was pressurized with tetrafluoroethylene (TFE) at 20.5 Bar and the reaction was started by feeding 60 ml of a solution containing 8 g/l of ammonium persulfate (APS). The pressure of the autoclave was maintained at constant value of 20.5 Bar by feeding TFE until a quantity of 600 grams of TFE were fed, after 150 minutes the TFE feeding was stopped. By keeping constant stirring of 480 rpm the autoclave was cooled to ambient temperature the white-latex obtained was discharged after being kept under nitrogen bubbling for 16 hours to strip away residual monomers from the polymerization, and then stored in a plastic tank. The latex was then coagulated and obtained polymer confirms to be insoluble in each tested solvent.

The invention claimed is:

1. A method for making a fluoropolymer, the method comprising emulsion polymerizing one or more than one fluorinated monomer in an aqueous medium wherein said aqueous emulsion polymerization is carried out in an aqueous medium in the presence of at least one radical initiator and at least one dispersant (D), wherein dispersant (D) is at least one polyfunctional perfluoropolyether dispersant comprising a plurality of ionisable groups (X) of —COOX$_a$, wherein X$_a$ is H, an ammonium group or a monovalent metal, optionally in combination with sulfonic acid groups of formula —SO$_3$X$_a$ and/or phosphonic acid groups of formula PO$_3$X$_a$, and complying with formula:

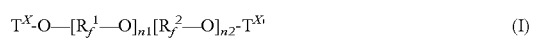  (I)

wherein:
each of $R_f^1$, equal to or different from each other at each occurrence, is a $C_1$-$C_4$ perfluoroalkylene group;
each of $R_f^2$, equal to or different from each other at each occurrence, is a $C_1$-$C_4$ perfluoroalkylene group comprising at least one group (X), as above detailed;
n1 and n2 are positive numbers different from zero; and
$T^X$ and $T^{X\prime}$, equal to or different from each other, are selected from the group consisting of:
(j) $C_1$-$C_{24}$ (hydro)(fluoro)carbon groups free from group (X), as above detailed, optionally comprising one or more than one of H, O, and Cl; and
(jj) $C_1$-$C_{24}$ (hydro)(fluoro)carbon groups comprising at least one group (X), as above detailed; and
said dispersant (D) possessing a number averaged molecular weight of more than 3000 and of at most 25000; and
wherein the amount of said ionisable groups in dispersant (D) is at least 0.35 meq/g.

2. The method of claim 1, wherein the amount of dispersant (D) is at least 0.05% wt and/or at most 3.20% wt, with respect to the total weight of the aqueous medium.

3. The method of claim 1, wherein the amount of said ionisable groups in dispersant (D) is at most 2.50 meq/g.

4. The method of claim 1, wherein repeating units —$R_f^1$—O— of the dispersant (D) are selected from the group consisting of:
(a1) units —$CF_2CF_2O$—
(b1) units —CFYO—
(c1) units —$CF_2CFYO$—
(d1) units —$CF_2O$—
(e1) units —$CF_2(CF_2)_zCF_2O$—,
wherein:
Y is a $C_1$-$C_5$ perfluoro(oxy)alkyl group; z is 1 or 2, and/or
wherein repeating units —$R_f^2$—O— of the dispersant (D) are selected from the group consisting of:
(a2) units —$CF_2CF(G_x)O$—
(b2) units —$CF(G_x)O$—
(c2) units —$CF_2(CF_2)_{x1}CF(G_x)(CF_2)_{x2}O$—, with X1 and X2 being zero or integers from 1 to 2, with the proviso that X1+X2 is at least 1,
wherein:
$G_x$ is a $C_1$-$C_5$ perfluoro(oxy)alkylene group comprising at least one group (X) selected from the group consisting of —$SO_3X_a$, —$PO_3X_a$ and —$COOX_a$, wherein $X_a$ is H, an ammonium group or a monovalent metal.

5. The method of claim 1 wherein repeating units —$R_f$—O— of the dispersant (D) are selected from the group consisting of:
(a2') units —$CF_2CF(COOX_a)O$—
(b2') units —$CF(COOX_a)O$—
(c2') units —$CF_2(CF_2)_{x1}CF(COOX_a)(CF_2)_{x2}O$—, with X1 and X2 being zero or integers from 1 to 2, with the proviso that X1+X2 is at least 1,
wherein $X_a$ is H, an ammonium group or a monovalent metal.

6. The method of claim 5, wherein dispersant (D) is a compound complying with formula:
$T^C$-O—$(CF_2CF_2O)_{a'}(CFYO)_{b'}(CF_2CFYO)_{c'}(CF_2O)_{d'}$ $(CF_2(CF_2)_zCF_2O)_{e'}$ $(CF_2CF(COOX_a)O)_{f'}(CF(COOX_a)O)_{g'}(CF_2CF(COOX_a)CF_2CF_2O)_{h'}$ $(CF_2CF_2CF(COOX_a)CF_2O)_{i'}$-$T^{C\prime}$,
wherein:
Y is a $C_1$-$C_5$ perfluoro(oxy)alkyl group;
z is 1 or 2;
a', b', c', d', e', f', g', h', i' are ≥0, with the proviso that a'+b'+c'+d'+e' is >0 and f'+g'+h'+i'>0;

$X_a$ is H, an ammonium group or a monovalent metal;
each of $T^C$ and $T^{C\prime}$, equal to or different from each other, are selected from the group consisting of (j) ionisable groups $T^{x\prime}$ of any of formulae —$CFZ^*$—$COOX_a$, —$CFZ^*CH_2$—$COOX_a$, and —$CFZ^*$—$CH_2(OCH_2CH_2)_k$—$COOX_a$, wherein $Z^*$ is F or $CF_3$; k is ranging from 0 to 10; $X_a$ is H, an ammonium group or a monovalent metal and (jj) non-ionisable groups $C_1$-$C_3$ (per)fluoroalkyl groups free from —$COOX_a$ groups, optionally comprising one or more than one of H, and Cl.

7. The method according to claim 1, wherein the fluorinated monomer is selected from the group consisting of:
$C_2$-$C_8$ perfluoroolefins;
$C_2$-$C_8$ hydrogen-containing fluoroolefins;
$C_2$-$C_8$ chloro- and/or bromo- and/or iodo-containing fluoroolefins;
fluoroalkylvinylethers of formula $CF_2$=$CFOR_{f1}$, wherein $R_{f1}$ is a $C_1$-$C_6$ fluoroalkyl;
fluorooxyalkylvinylethers of formula $CF_2$=$CFOX_0$, wherein $X_0$ is a $C_1$-$C_{12}$ fluorooxyalkyl group comprising one or more than one ethereal oxygen atom;
fluorodioxoles, of formula:

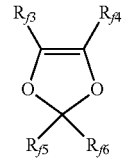

wherein each of $R_{f3}$, $R_{f4}$, $R_{f5}$, $R_{f6}$, equal or different each other, is independently a fluorine atom, or a $C_1$-$C_6$ fluoro(halo)fluoroalkyl, optionally comprising one or more oxygen atom.

8. The method according to claim 1, wherein the method comprises emulsion polymerizing vinylidene fluoride (VDF) optionally in combination with one or more than one hydrogenated and/or fluorinated monomer different from VDF.

9. The method according to claim 1, wherein the method is carried out in substantial absence of fluorinated emulsifiers having a molecular weight of less than 1000, and no such fluorinated emulsifier is purposely added to the polymerization.

10. The method according to claim 9, wherein the method comprises emulsion polymerizing tetrafluoroethylene (TFE) optionally in combination with one or more than one hydrogenated and/or fluorinated monomer different from TFE.

11. A fluoropolymer dispersion obtained from the method according to claim 1.

12. A fluoropolymer dispersion comprising fluoropolymer particles and at least one dispersant (D), wherein dispersant (D) is at least one polyfunctional perfluoropolyether dispersant comprising a plurality of ionisable groups (X) of —$COOX_a$, whereas $X_a$ is H, an ammonium group or a monovalent metal, optionally in combination with sulfonic acid groups of formula —$SO_3X_a$ and/or phosphonic acid groups of formula $PO_3X_a$, and complying with formula:

$$T^X\text{-O}—[R_f^1—O]_{n1}[R_f^2—O]_{n2}\text{-}T^{X\prime} \qquad (I)$$

wherein:
(i) each of $R_f^1$, equal to or different from each other at each occurrence, is a $C_1$-$C_4$ perfluoroalkylene group;

(ii) each of $R_f$, equal to or different from each other at each occurrence, is a $C_1$-$C_4$ perfluoroalkylene group consisting at leas one group (X), as above detailed; and (iii) n1 and n2 are positive numbers different from zero; and $T^X$ and $T^{X'}$, equal to or different from each other, are selected from the group consisting of:

(j) $C_1$-$C_{24}$ (hydro)(fluoro)carbon groups free from group (X), as above detailed, optionally comprising one of more than one of H, O, and Cl; and (jj) $C_1$-$C_{24}$ (hydro)(fluoro)carbon groups comprising at least one group (X), as above detailed; and said dispersant (D) possessing a number of averaged molecular weight of more than 3000 and of at most 25000; and wherein the amount of said ionisable groups in dispersant (D) is at least 0.35 meq/g.

13. The method of claim 2, wherein the amount of dispersant (D) is at least 0.10% wt and at most 3.00% wt, with respect to the total weigh of the aqueous medium.

14. The method of claim 3, wherein the amount of said ionisable groups in dispersant (D) is at least 0.40 meq/g, with respect to the weight of dispersant (D), and at most 2.20 meq/g.

15. The method according to claim 7, wherein the fluorinated monomer is selected from the group consisting of:
tetrafluoroethylene (TFE), hexafluoropropylene (HFP), perfluoroisobutylene;
trifluoroethylene (TrFE), vinylidene fluoride (VDF), vinyl fluoride (VF), pentafluoropropylene, and hexafluoroisobutylene;
chlorotrifluoroethylene (CTFE) and bromotrifluoroethylene;
fluoroalkylvinylethers of formula $CF_2=CFOR_{f1}$, wherein $R_{f1}$ is $-CF_3$, $-C_2F_5$, or $-C_3F_7$;
fluoromethoxyalkylvinylethers of formula $CF_2=CFOCF_2OR_{f2}$, wherein $R_{f2}$ is a $C_1$-$C_3$ fluoro(oxy)alkyl group;
fluorodioxoles, of formula:

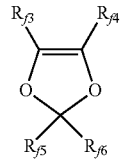

wherein each of $R_{f3}$, $R_{f4}$, $R_{f5}$, $R_{f6}$, equal or different from each other, is independently a fluorine atom, $-CF_3$, $-C_2F_5$, $-C_3F_7$, $-OCF_3$, or $-OCF_2CF_2OCF_3$.

16. The method according to claim 1, wherein dispersant (D) has a number averaged molecular weight of more than 4000 and of at most 25000.

* * * * *